Nov. 3, 1931. R. A. WEINHARDT 1,830,149
CUSHIONED CONNECTING MEANS FOR MOTOR VEHICLES
Filed June 17, 1927

Inventor
ROBERT A. WEINHARDT.
By ⟨signature⟩
Attorney

Patented Nov. 3, 1931                                                    1,830,149

UNITED STATES PATENT OFFICE

ROBERT A. WEINHARDT, OF DETROIT, MICHIGAN, ASSIGNOR TO PACKARD MOTOR CAR COMPANY, OF DETROIT, MICHIGAN, A CORPORATION OF MICHIGAN

CUSHIONED CONNECTING MEANS FOR MOTOR VEHICLES

Application filed June 17, 1927. Serial No. 199,459.

This invention relates to motor vehicles and more particularly to insulators for spring seats.

One of the important problems in motor vehicle construction is that of eliminating the disagreeable effect of vibrations, such vibrations being the cause of discomfort to passengers and of serious wear and tear to the vehicle, and a relative problem is that of reducing stress in the various parts of a motor vehicle caused by unavoidable jolting or shock, transmitted through the wheels, springs and frame to the body.

An object of the invention is to increase the riding comfort in a motor vehicle by the elimination of noise and vibration.

Another object of the invention is to provide an insulator designed to eliminate noise and vibration usually transmitted from the axle of a motor vehicle to the springs.

Another object of the invention is to provide an insulator arranged between the axle of a motor vehicle and the seats of the springs, designed to deaden noise and to absorb shock or vibration otherwise transmitted from the axle to the springs.

Another object of the invention is to provide insulating bushings arranged between the axle of a motor vehicle and the seats of the springs, the bushings being designed to have a pleasing appearance and yet to efficiently perform their intended function.

Another object of the invention is to provide an insulating bushing for mounting a spring seat, the bushing having the advantages of a positive insulator, of high efficiency in operation, and of marked simplicity so that its manufacture is economically facilitated and its assembly easily accomplished.

Figure 1:
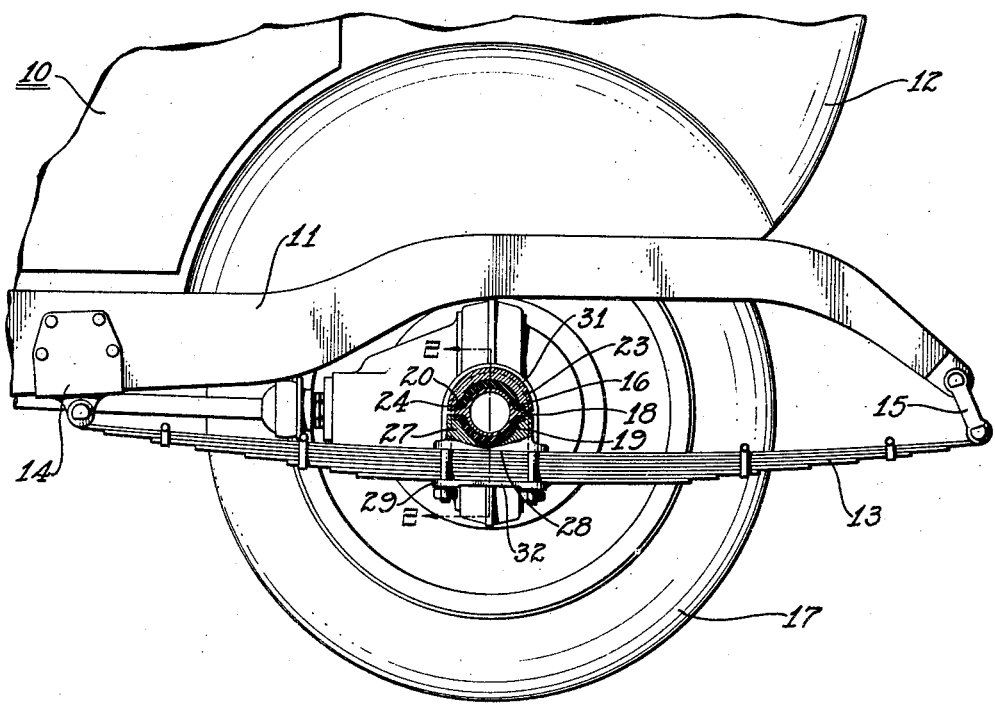
Figure 2:
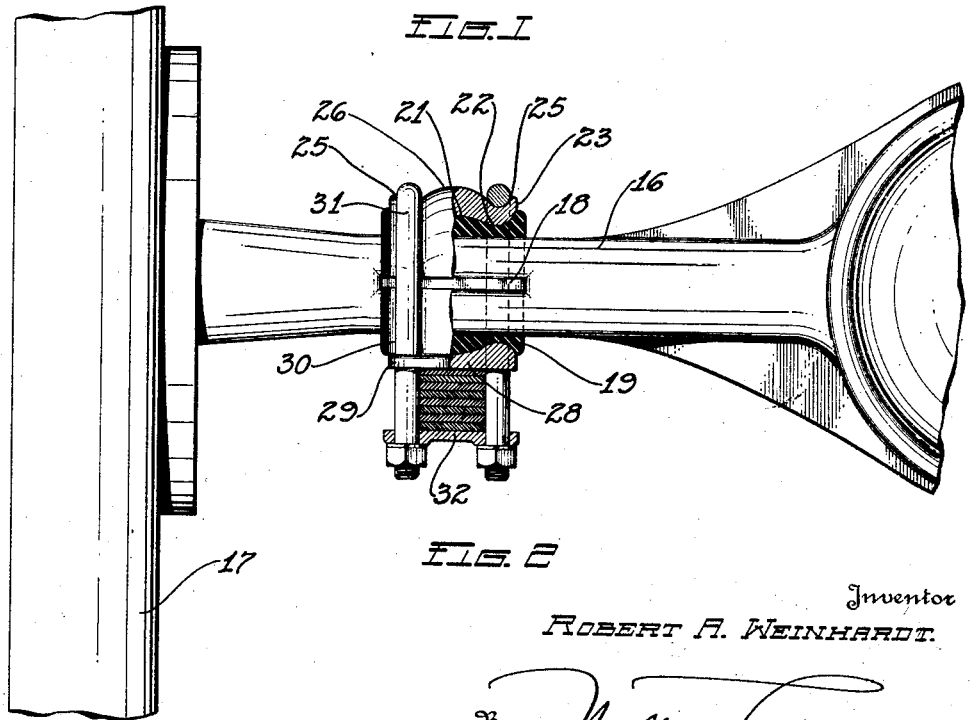

Other objects of the invention will appear from the following description taken in connection with the drawings, which form a part of this specification, and in which:

Fig. 1 is a side elevation of a portion of a motor vehicle illustrating the invention as applied, and Fig. 2 is a side elevation of a portion of a rear axle having a wheel thereon, the axle carrying a spring seat shown partly in section, the section being taken substantially on line 2—2 of Fig. 1.

Referring by numerals to the drawings, 10 represents generally a motor vehicle, including the side bars 11 of a chassis frame upon which is mounted a body 12, the side bars being supported by a semi-elliptical spring 13. As shown, the spring 13 is pivotally connected at its forward end to a bracket 14 on the side bar and its other or rear end is shackled as indicated at 15 to the rear end of the side bar. The spring 13 is suspended beneath an axle 16 in the underslung position, by means to be hereinafter described, and the axle has mounted thereupon in the conventional manner, a wheel 17.

The housing of the axle is formed with corresponding oppositely disposed horizontal lugs or ribs 18. A split bushing 19 of resilient material, such as rubber, is arranged upon the axle housing. As shown, the respective sections of the split bushing are provided with radial end flanges 20 which abut the sides of the lugs or ribs 18. The inner surface of the bushing is formed with the same general contour as the circumference of the axle housing so as to fit snugly thereon and the periphery of the bushing has a circumferential convex central portion 21 arranged between circumferential grooves 22 adjacent the respective ends of the bushing.

The circumferential convex portion of the bushing flanked by the circumferential grooves provides a very satisfactory saddle for a split sleeve 23, the inner surface of which conforms to the periphery of the bushing, preventing displacement. The respective ends of the sleeve sections are provided with notches 24 which receive the radial flanges 20 upon the bushing and enclose the same, the ends of the sleeve sections being slightly spaced apart to permit the clamping of the bushing with sufficient pressure to bind the parts together. The circumference of one of the sleeve sections conforms substantially to the circumference of the bushing, hence, there are grooves 25 spaced apart by a convex portion 26. The other section of the sleeve has an enlarged portion 27 upon which is formed a spring seat 28 and flanges 29, the flanges having spaced apertures with alined grooves 30 arranged on each side of the spring seat, the apertures and their alined grooves registering with the grooves in the other sleeve section. Clips or U-bolts 31 are seated in the grooves 25 and 30 and the apertures register therewith, one on each side of the spring 13, and a plate 32 is mounted upon the clip or U-bolt to clamp the spring upon the seat.

The invention herein described has the advantage that increased riding comfort in a motor vehicle is assured by the elimination of noise and vibration transmitted from the axle to the springs and thence through the frame to the body, and in addition, the life of the entire vehicle is lengthened by eliminating stress and strain caused by the shock and vibration.

Although this invention has been described in connection with certain specific embodiments, the principles involved are susceptible of numerous applications that will readily occur to persons skilled in the art. The invention is, therefore, to be limited only as indicated by the scope of the appended claims.

Having thus described the various features of my invention what I claim is new and desire to secure by Letters Patent is:

1. A spring seat having a sleeve, the inner and external surfaces of the sleeve having a circumferential concave portion and a bushing for the sleeve having a circumferential convex portion engaging the concave portion of the sleeve.

2. A spring seat having a sleeve provided with spaced internal and external circumferential convex portions connected by a circumferential concave portion and a flexible insulating bushing for the sleeve.

3. A spring seat having a sleeve provided with spaced internal and external circumferential convex portions connected by a circumferential concave portion and a flexible bushing having a periphery conforming to the contour of the internal surface of the sleeve.

4. In a motor vehicle the combination with an axle, of a spring seat on the axle comprising a split sleeve having internal and external circumferential grooves and a flexible insulating interlocking split bushing for the sleeve.

5. In a motor vehicle, the combination of an axle, of a spring seat on the axle comprising a split sleeve having spaced internal and external circumferential convex portions connected by circumferential concave portions, a flexible insulating bushing conforming to the sleeve and means positioned in the exteral concave portions for securing the parts together.

6. In a motor vehicle, the combination of an axle having radial lugs, of a spring seat upon the axle comprising a flexible insulating split bushing, the sections of the bushing having radial end flanges abutting the radial lugs upon the axle, a split sleeve surrounding the bushing, said sleeve having internal and external grooves and means positioned in the external grooves for clamping the parts together.

7. In a motor vehicle, the combination with an axle having oppositely disposed radial lugs, of a spring seat upon the axle comprising a flexible insulating split bushing, the sections of the bushing having end flanges abutting the radial lugs upon the axle, the bushing having grooves formed in its periphery, a sleeve for the bushing, the inner surface of the sleeve conforming to the outer surface of the bushing and the outer surface of the sleeve having spaced grooves adapted to receive spaced means for clamping the parts upon the axle.

8. A spring seat for securing an axle of a motor vehicle to a spring comprising a split insulating bushing surrounding the axle, a split sleeve surrounding the bushing, the sleeve being grooved on its inner wall to engage the bushing and grooved on its outer wall to engage a fastening means and provided with a flattened portion to engage the spring, and a fastening means surrounding the two parts of the sleeve, and the spring for securing them together.

9. A spring seat for securing an axle of a motor vehicle to a spring comprising a split insulating bushing surrounding the axle, a split sleeve surrounding the bushing, the bushing and sleeve being provided with interlocking lugs and recesses, a pair of U-bolts partly encircling the split sleeve and partly surrounding the spring and a plate beneath the spring and engaged by the U-bolts to clamp the spring and axle together.

In testimony whereof I affix my signature.

ROBERT A. WEINHARDT.